No. 890,652. PATENTED JUNE 16, 1908.
H. J. M. HOWARD.
HOSE RACK.
APPLICATION FILED NOV. 27, 1906.
2 SHEETS—SHEET 1.
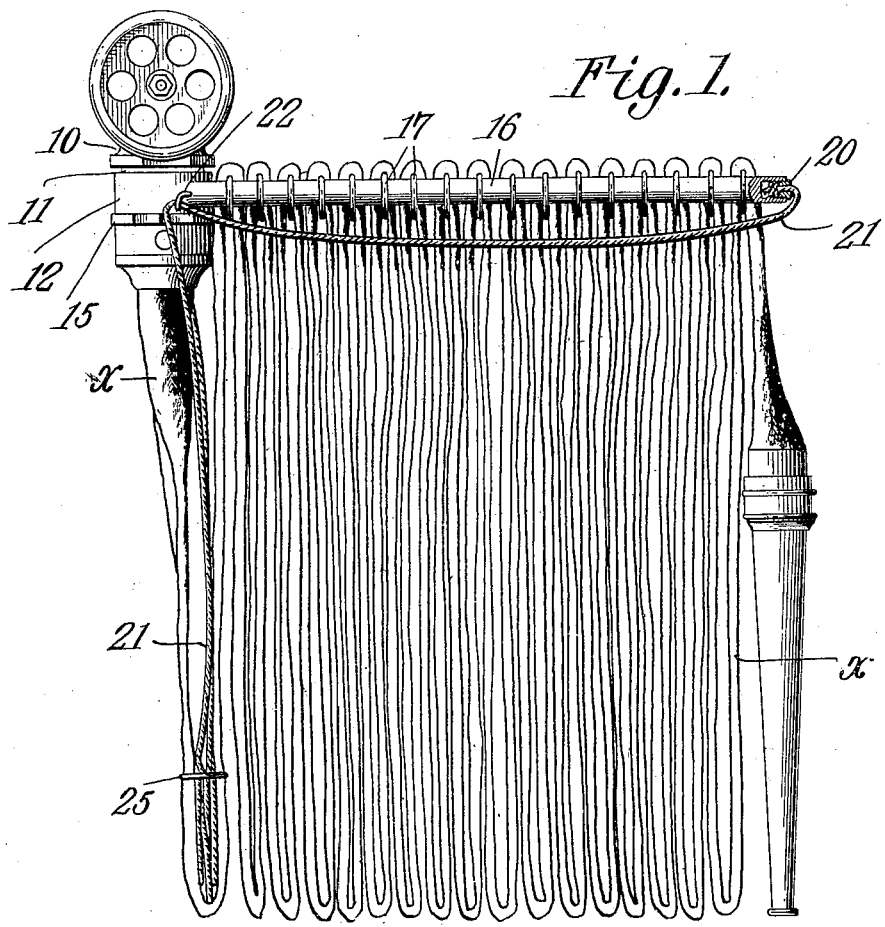
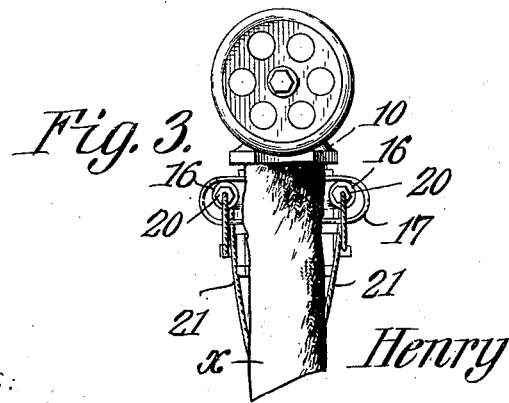
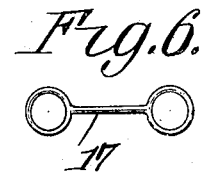
Henry J. M. Howard,
INVENTOR
WITNESSES:
By C. A. Snow & Co.
ATTORNEYS

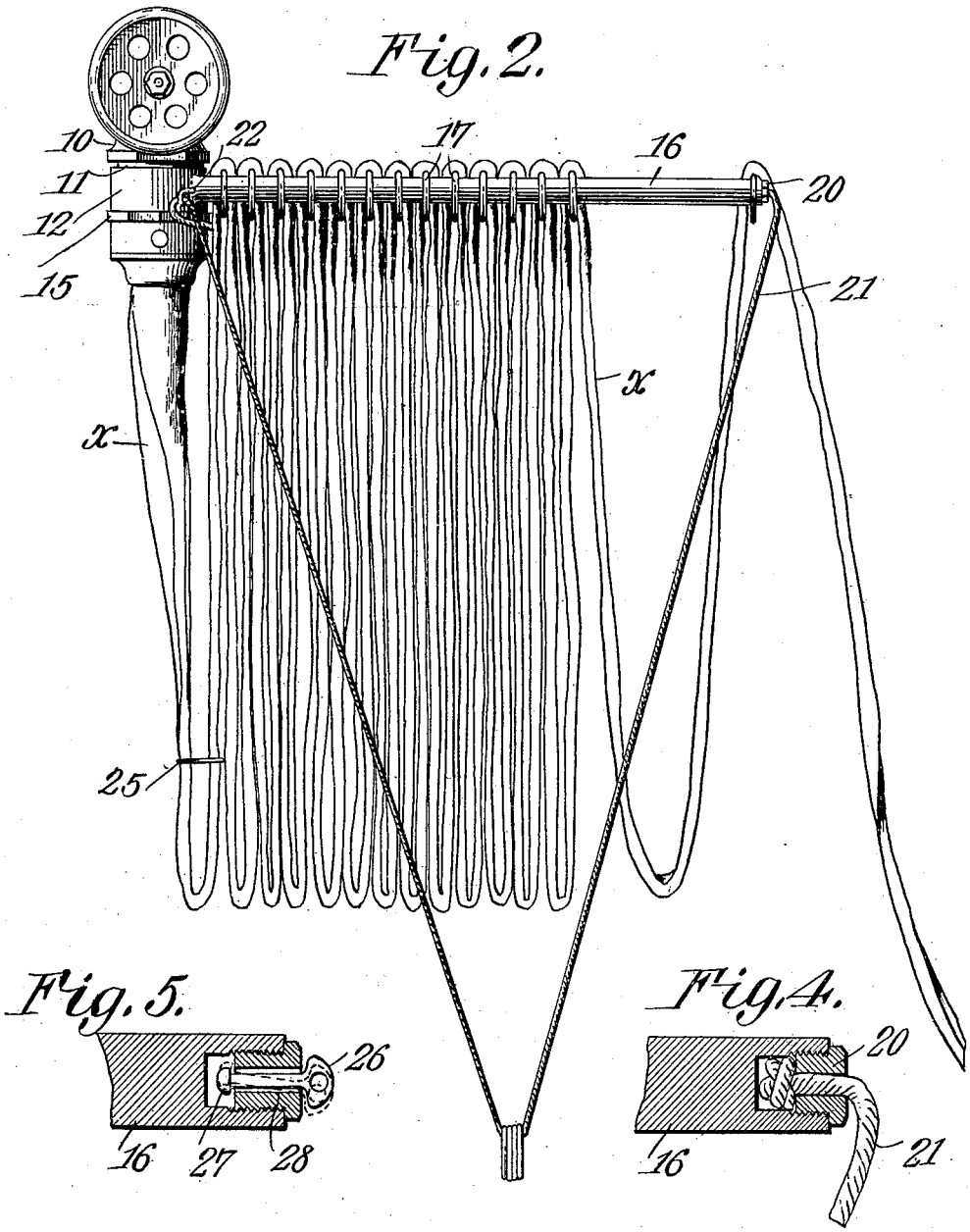

UNITED STATES PATENT OFFICE.

HENRY J. M. HOWARD, OF WASHINGTON, DISTRICT OF COLUMBIA.

HOSE-RACK.

No. 890,652.  Specification of Letters Patent.  Patented June 16, 1908.

Application filed November 27, 1906. Serial No. 345,336.

*To all whom it may concern:*

Be it known that I, HENRY J. M. HOWARD, a citizen of the United States, residing at Washington, District of Columbia, have invented a new and useful Hose-Rack, of which the following is a specification.

This invention relates to hose racks, and has for its principal object to provide a novel construction of rack in which the folds of the hose are hung on supporting members which are so mounted as to prevent their falling to the floor when the hose is withdrawn.

A further object of the invention is to provide a hose supporting rack in which the links or similar supporting members are free to move from the rack proper as the hose is withdrawn without becoming entirely detached and falling to the floor.

A still further object of the invention is to provide a hose rack in which the hose supporting links or bars are arranged to slide on to an auxiliary support or supports as the hose is withdrawn from the rack.

A still further object of the invention is to provide a hose rack in which the hose supporting links or bars are arranged to slide on to a flexible support or supports which are automatically moved to clear the hose as soon as the first fold of the latter is withdrawn.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a side elevation of a hose rack constructed in accordance with the invention, showing the hose in position thereon. Fig. 2 is a similar view showing a portion of the hose withdrawn. Fig. 3 is an end elevation of the rack. Fig. 4 is a detail sectional view of the end of the supporting arms of the rack. Fig. 5 is a similar view illustrating a slight modification of the same. Fig. 6 is a detail view of a modified construction of hose supporting member.

Similar numerals of reference are employed to indicate corresponding parts throughout the several figures of the drawings.

The hose rack is preferably supported by the water pipe, and in the present instance the lower portion of the valve casing 10 is provided with a nipple 11 on which is mounted a collar 12 that forms an integral part of the rack, said collar being held in place by a flange 15 which may form a portion of the connection for the hose $x$.

The collar permits the hose rack to swing around to convenient position for the withdrawal of the hose in any direction, and when not in use the rack may be turned flat against the wall.

Projecting from the collar 12 are two parallel arms 16 which, in the present instance, are shown round in cross section, and on these arms are arranged hose supporting members which may be in the form of simple links 17, as shown in Fig. 3, or may be in the form of bars supplied with eyes at both ends, as shown in Fig. 6, said hose supporting members being of sufficient size to slide freely in the direction of the length of the arms.

The arms 16 may be solid or tubular, and in the outer end of each is screwed a hollow bushing 20 through which passes a link supporting member 21, this member being shown in the present instance in the form of a cord, the end of the cord being knotted and passed through the bushing, so that when the latter is screwed in place, the ends of the cord will be firmly held. The bight of the cord is carried back through suitable guiding eyes 22 at or near the rear ends of the arms. The eyes may be formed in integral lugs projecting from the rear portions of the arms or the collar 12, or may be formed on separate members screwed or otherwise secured in place, but preferably are so arranged as not to interfere with nesting of the empty racks when the latter are packed for shipment or storage.

The excess cord is loosely rolled and tucked between the last three folds of the hose, as shown in Fig. 1, and, if necessary, these folds may be held together by a tie 25 which may be in the form of an ordinary elastic band.

To withdraw the hose from the rack, it is merely necessary to grasp the nozzle and pull, and the successive folds will be withdrawn in the manner indicated in Fig. 2, the hose supporting links passing over the ends of the arms and falling on to the retainer 21, and as the links slide down the latter, they will draw the excess cord out to the position shown in Fig. 2, so that the links will fall down free from the hose and will not in any manner interfere with the withdrawal of the latter.

After use, the hose may be returned to the rack and the links are in convenient position to be slipped up over the retainers, and onto the arms, the successive folds being placed over the links until the entire hose is racked.

It will be observed that the links are held from falling to the floor, but in order that the links may be detached, as for the purpose of more conveniently placing them in position on the arms 16, the ends of the link retainer may be connected to small tip members 26 having enlarged heads 27, which may be slipped through the opening in the bushing, the head of the tip being very slightly less in diameter than the opening, so that when the head passes beyond the inner end of the bushing, it will be automatically locked and cannot be removed until the head is exactly central in the bushing. In this case, after the hose has been used, the tips may be centered in order to permit release of the ends of the retainer, after which all of the links can be taken off and placed in position on the rack in order to support the hose and then the ends of the retainer can once more be attached to the ends of the rack arms.

It is, of course, obvious that a retainer at one side only of the rack would be sufficient for the purpose, and that while a flexible retainer is shown in the present instance, it may, in some cases, be formed of a metal rod or bar of the general shape indicated in Fig. 2, or of such other shape as may be deemed most convenient for the purpose.

I claim:—

1. A hose rack including a pair of arms, hose supporting members slidably mounted thereon and movable from the arms during the removal of the hose, and a retaining device supported at both ends and on to which said hose supporting members pass when detached from the arms.

2. In a hose rack, a pair of arms, hose supporting members slidably mounted thereon and movable bodily from the arms, and a retaining means supported at both ends and with which said members engage as they pass from the arms.

3. In a hose rack, a pair of arms, hose supporting members, slidably mounted thereon, and free to move beyond the ends of the arms during the removal of the hose, and a retainer the opposite ends of which are carried by one of said arms, and with which said members engage as they pass from the arms.

4. In a hose rack, a pair of arms, hose supporting members slidably mounted thereon, a flexible retainer with which said members engage as they pass from the arms, and supports with which the opposite ends of said retainer engage.

5. In a hose rack, a pair of arms, hose supporting members slidably mounted thereon, a flexible retainer having its opposite ends secured to the ends of the arms and adapted to receive said members as the hose is withdrawn, and guiding eyes for the reception of the bight of the retainer.

6. In a hose rack, a pair of arms, hose supporting members slidably mounted thereon, a pair of eyes extending from the base portions of the arms, and a flexible retaining member extending through said eyes and having its opposite ends secured to the ends of the arms, the flexible retaining member being adapted to receive the hose supporting members as the hose is withdrawn.

7. In a hose rack, a pair of arms, hose supporting members slidably mounted thereon, and a retaining device having its ends detachably secured to the ends of said arms, the retaining device being adapted to receive the hose supporting members as the hose is withdrawn.

8. The combination with a hose rack, of a collar, a pair of arms projecting therefrom, links slidably mounted upon said arms, and free to pass therefrom during the removal of the hose, and a flexible cord having its opposite ends secured to the ends of said arms and serving to receive said members as they pass from the arms.

In testimony that I claim the foregoing as my own, I have hereto affixed my signature in the presence of two witnesses.

HENRY J. M. HOWARD.

Witnesses:
E. HUME TALBERT,
W. J. WARRINER.